Sept. 20, 1938. H. E. KAISER 2,130,626
PROCESS FOR QUENCHING PORTLAND CEMENT CLINKERS
Filed Sept. 20, 1937
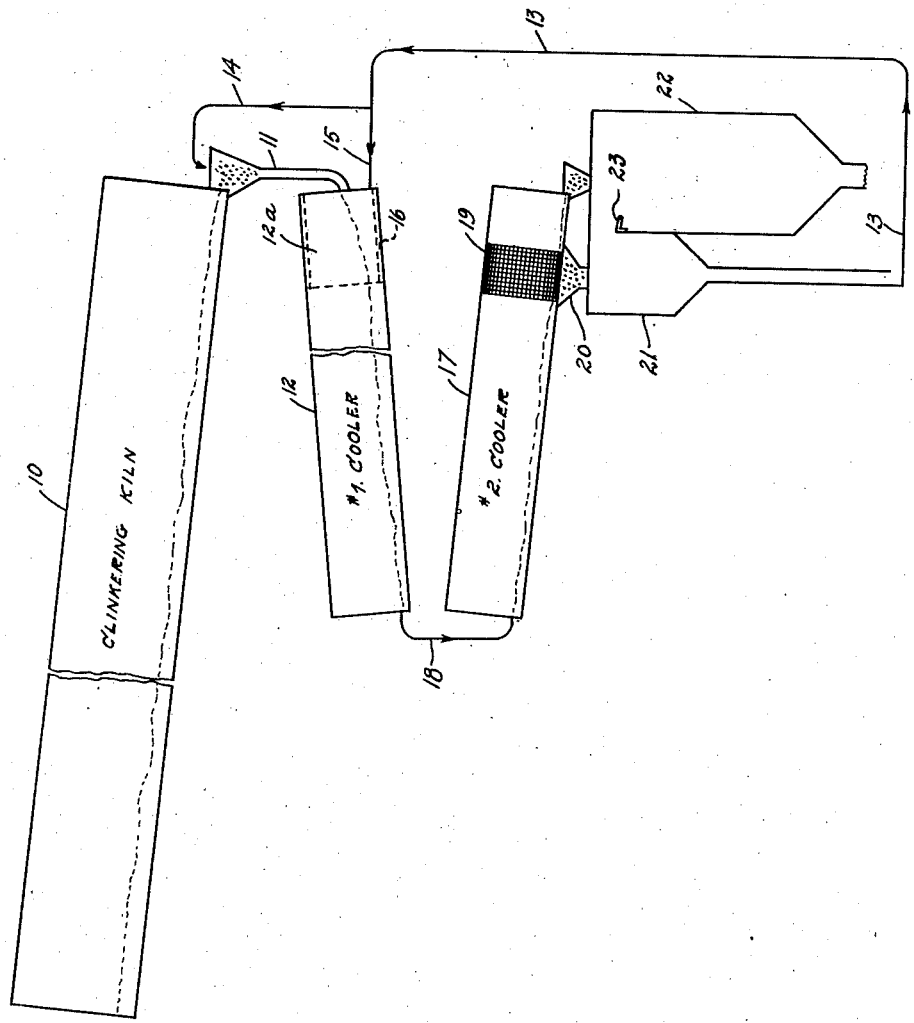
Inventor.
Harry E. Kaiser.
Attorney.

Patented Sept. 20, 1938

2,130,626

UNITED STATES PATENT OFFICE 2,130,626

PROCESS FOR QUENCHING PORTLAND CEMENT CLINKER

Harry E. Kaiser, Colton, Calif., assignor to California Portland Cement Company, Los Angeles, Calif., a corporation of California

REISSUED
NOV 26 1940

Application September 20, 1937, Serial No. 164,6••

10 Claims. (Cl. 263—53)

This invention relates generally to the manufacture of Portland cement, and has to do particularly with an improved process for rapidly quenching Portland cement clinker by means of another Portland cement clinker that is finely divided and admixed with the clinker undergoing quenching, under conditions that effect rapid and uniform cooling of the latter.

It has come to be recognized that very definite advantages, from a number of standpoints, result from quenching, i. e. very rapid cooling, of Portland cement clinker. Theoretically, one object of rapid quenching of the clinker while it is at substantially the clinker forming temperature, is to "freeze" the equilibrium which has been set up at the clinkering temperatures among the various compounds in the clinker. Accordingly, it is desirable to quench the clinker immediately or very shortly after it passes from the clinkering zone of the kiln. It will suffice to state, without entering into a specific discussion of the individual compounds or their interrelationship and effects under equilibrium conditions, that it has become recognized that by maintaining or freezing that equilibrium by rapid quenching, certain properties of the clinker itself, and of the finished cement, are definitely improved.

A number of apparent advantages result from rapid quenching of Portland cement clinker. Quenching appears to promote ease of grindability, as indicated by the fact that the quenched clinker will be reduced to a finer state of division when subjected to a given grinding operation, than a normally cooled or quenched clinker ground under the same conditions. It is also indicated that the resultant clinker will have less tendency to "dust." Tests indicate that cementitious or concrete mixtures containing cement made from the quenched clinker, show a materially lowered degree of expansion under the standard methods of determination.

In accordance with the invention, the hot clinker is admixed with a finely divided and relatively cool Portland cement clinker (hereinafter referred to as the quenching clinker), preferably immediately after the hot clinker leaves the clinkering zone of the kiln, in order that the "freezing" effect of quenching may be had upon the hot clinker while it is still as close as possible to the kiln temperature. If desired the quenching clinker may be introduced into the nose of the kiln itself. Any suitable quantity or proportion of the quenching clinker may be admixed with the hot clinker that will produce the desired and proper quenching effect. I have obtained very satisfactory results by admixing with one part of the hot clinker, around three parts by weight of the quenching clinker of a fineness passing a quarter-inch mesh screen. As indicated, these relative proportions of the admixed hot and quenching clinker may vary in accordance with other factors, as for example the temperature differential between the two materials in a given instance. In this connection it may be observed that the quenching clinker may be cold, or it may be slightly heated to a temperature under say 300° F. As a general rule the proportion of quenching clinker in the admixture will be substantially in excess of the hot clinker undergoing quenching.

For the purpose of facilitating the desired rapidity and uniformity of quenching, the hot clinker and quenching clinker may be rapidly and intimately admixed in any suitable manner within a cooling zone, for example in an elongated cylinder that is rotated to give continuous mixing agitation. The admixture is maintained in the cooling zone for a period of time required to drop the clinker temperature through the proper quenching range. Various factors may enter into the time element, but it may be stated, as illustrative, that ordinarily it will be desirable to cool the clinker from a temperature that may range from well above 1800° F. to as high as 2600° F., to a temperature under 700° F., within a period of five minutes. After the hot clinker has become quenched, the quenching clinker is then separated therefrom in one or more separating or screening stages sufficient to free the quenched clinker from the quenching clinker. Absolute and complete separation may not be essential, particularly where the two clinkers have similar composition and properties, and in any event a small percentage of quenching clinker fines remaining in the quenched clinker will be unobjectionable. The quenched clinker may then be ground or processed by any of the usual methods of producing Portland cement. The separated quenching clinker however, having become sufficiently cooled before separation from the quenched clinker, or afterward, is again used as a quenching medium for subsequently formed clinker. In this manner, the same quantity of quenching clinker may be recirculated repeatedly as a quenching medium for a continuously flowing stream of hot Portland cement clinker.

Perhaps the foregoing description of the process can be amplified to advantage by reference to a typical and illustrative system for carrying out the invention, as shown diagrammatically and in flow sheet form in the accompanying drawing.

Portland cement clinker formed in the clinkering kiln 10 is delivered by suitable means, conventionally illustrated by chute 11, into the upper end of an elongated cylindric cooler 12 that preferably is slowly rotated by suitable means, not shown. The finely divided quenching clinker may be fed from a conveyor line 13 through line 14 to be admixed with the hot clinker at the inlet end of chute 11 and directly after the clinker leaves the kiln, for the quenching clinker may be taken via line 15 and fed into the inlet end 12a of the cooling chamber. As illustrated, the feed end of the chamber may contain a suitable refractory lining 16. The two clinkers are rapidly brought into intimate contact and subjected to thorough admixture within the rotating cooler 12. The admixture will remain in the cooler for a period of time required to quench the clinker through the proper temperature range, and ordinarily a time period of around five to ten minutes will suffice where a ratio of substantially three parts of quenching clinker to one part of the hot clinker is used.

The admixture may be subjected to further cooling and further agitation to completely separate the quenching clinker from the quenched clinker, in a second cooler 17 into which the material is fed from the discharge end of cooler 12 via line 18. Cooler 17 may have one or more screen sections 19 through which the freed and relatively fine quenching clinker particles will pass into a hopper 20 and thence into a storage bin 21. As illustrated, the separated quenching clinker will be continuously taken from bin 21 by way of conveyor line 13 to be returned for admixture with the hot clinker being discharged from the clinker kiln. Separated quenched clinker is discharged from cooler 17 into storage bin 22. During the quenching and cooling stages, particles of the quenched clinker reduced to a fineness enabling them to pass through the screen 19, may become separated out with the quenching clinker, resulting in an increase in the quantity of clinker being discharged into bin 21. Any excess over the amount of quenching clinker required for installation, may be combined with the quenched clinker in storage 22, as by providing an overflow ledge at 23 between the two bins.

I claim:

1. The process that includes, quenching hot Portland cement clinker by admixing relatively cool Portland cement clinker with the hot clinker.

2. The process that includes, quenching hot Portland cement clinker by admixing relatively cool and finely divided Portland cement clinker with the hot clinker.

3. The process that includes, quenching hot Portland cement clinker by admixing relatively cool and finely divided Portland cement clinker with the hot clinker, and agitating the mixture while the hot clinker cools.

4. The process that includes, quenching hot Portland cement clinker by admixing relatively cool Portland cement clinker with the hot clinker, maintaining the clinkers in intimate contact while the hot clinker cools, and separating added clinker from the quenched clinker.

5. The process that includes, quenching hot Portland cement clinker by admixing relatively cool quenching Portland cement clinker with the hot clinker, maintaining the clinkers in intimate contact while the hot clinker cools, separating quenching clinker from the quenched clinker, and admixing the separated quenching clinker with subsequently produced hot Portland cement clinker to quench same.

6. The process that includes, quenching a continuously flowing stream of hot Portland cement clinker by continuously adding to and intimately admixing with the hot clinker a relatively fine and cool Portland cement clinker, maintaining the clinkers in contact while the hot clinker cools, and then continuously separating added clinker from the quenched clinker.

7. The process that includes, quenching a continuously flowing stream of hot Portland cement clinker by continuously adding to and intimately admixing with the hot clinker a relatively fine and cool quenching Portland cement clinker, maintaining the clinkers in contact while the hot clinker cools, then continuously separating quenching clinker from the quenched clinker, and continuously returning and adding separated quenching clinker to the hot clinker stream.

8. The process that includes, continuously passing a stream of hot Portland cement clinker from a clinkering zone, then quenching the hot clinker by immediately and continuously introducing to and intimately admixing with the hot clinker stream a relatively finely divided and cool Portland cement clinker, and passing the mixture through a cooling zone.

9. The process that includes, continuously passing a stream of hot Portland cement clinker from a clinkering zone, then quenching the hot clinker by immediately and continuously introducing to and intimately admixing with the hot clinker stream a relatively finely divided and cool Portland cement quenching clinker, passing the mixture through a cooling zone, and then continuously separating the quenching clinker from the quenched clinker.

10. The process that includes, continuously passing a stream of hot Portland cement clinker from a clinkering zone, then quenching the hot clinker by immediately and continuously introducing to and intimately admixing with the hot clinker stream a relatively finely divided and cool Portland cement quenching clinker, passing the mixture through a cooling zone, then continuously separating added quenching clinker from the quenched clinker, and continuously returning and adding separated quenching clinker to the hot clinker stream.

HARRY E. KAISER.